United States Patent Office 2,862,904
Patented Dec. 2, 1958

2,862,904

VINYL CHLORIDE RESIN PLASTICIZED WITH A BIS-(3,4 EPOXYCYCLOHEXANECARBOXYLATE) AND COMPOSITION CONTAINING SAME

Dennis H. Mullins, St. Albans, W. Va., assignor to Union Carbide Corporation, a corporation of New York No Drawing. Application October 20, 1955
Serial No. 541,839

10 Claims. (Cl. 260—30.4)

This invention relates to plasticized and heat and light stabilized polymer compositions and has for an object the provision of improved polymer compositions in which the heat and light stabilizers also act as plasticizers and thus serve as combination plasticizers and stabilizers. More particularly, this invention is directed to plasticized vinyl halide polymers and to heat and light stabilized vinyl halide polymers.

Like many other resins and resin-like materials, the vinyl halide resins form the basis of various plastic compositions in which they are associated with other substances which modify their properties in some desirable manner. For example, the vinyl resins may be compounded with various softening substances of low volatility which act as plasticizers to form softened compositions of increased resilience and flexibility. In common with most related compositions, the plasticized vinyl halide resins generally become increasingly softer and the heat softening temperature of the compositions is reduced as the amount of plasticizer in the composition is increased. Also, it is quite usual for these softened compositions to exhibit an increased tendency toward tackiness as the quantity of plasticizer is increased, and this quality is almost invariably present when the plasticized compositions are additionally softened by heat. The effect of plasticizers on the physical properties of finished plastic products containing the same is indeed an important part of the success of plastic products in industry today.

With the increasing demand for plastic products and plastic-containing products in a wide variety of industrial applications, many changes have been made by the plastics manufacturer to keep pace with the demand for new and useful plastic products.

High-speed, high-temperature processing of vinyl halide resin compositions, and their increasing use in outdoor applications, such as garden hose, automotive upholstery, automobile convertible tops, agricultural irrigation accessories, agricultural goods and implements and the like have placed increasing demands for better plasticizers and stabilizers for use in vinyl halide resin compositions to alleviate certain shortcomings inherent in these resins. One of the most serious problems is the deteriorating effects of heat and light upon vinyl halide resin compositions. These deleterious effects are manifested by discoloration and loss of mechanical strength of the resin composition.

In the case of plasticized vinyl halide resins, the problem may be further aggravated by instability on the part of the plasticizer and this condition may result in unsightly and troublesome exudation that has an adverse effect on the physical properties and appearance of the composition. Exudation of the plasticizer is very often the result of alterations in the chemical structure of the plasticizer through attack by the degradation products of the resin, or by the action of sunlight or the combined action of both. Thus, not only is there a need for adequate stabilization of the resin against the effects of heat and light, but the plasticizer as well may require some protection.

On the other hand, a compound that exhibits good heat-stabilizing ability with vinyl halide resins may be relatively ineffective as a light stabilizer. For certain applications, particularly those utilizing plasticized, transparent, vinyl halide compositions, a highly desirable stabilizer would be one that possesses ability to plasticize as well as stabilize against both heat and light. Some progress, in this direction, has been made in recent years with the discovery that certain epoxidized natural oils are attractive plasticizer-stabilizer combinations for poly-vinyl chloride and some vinyl chloride-containing copolymers but, however, it has been shown that resin compositions utilizing epoxidized natural oils are limited in their uses since they are not entirely compatible with vinyl chloride polymers and destruction of epoxidized natural oil by the degradation products of the resin causes exudation from the resin composition.

It is a principal object, therefore, to provide resin compositions which are markedly superior to resin compositions containing epoxidized natural oils.

It has been discovered that this and other objects of the invention can be readily accomplished by intimately associating with vinyl halide compositions an amount of a diepoxide represented by the following general formula:

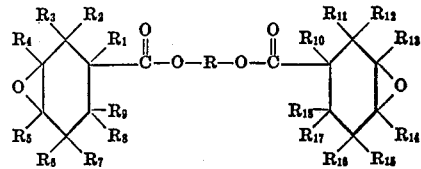

wherein R represents a divalent organic hydrocarbon radical such as an aliphatic hydrocarbon radical and oxygen interrupted alkylene radicals and wherein the radicals $R_1$ through $R_{18}$ represent hydrogen atoms and alkyl groups. More particularly, when any of the radicals $R_1$ through $R_{18}$ represent an alkyl group, the alkyl group is a lower alkyl group, such as, for example, methyl, ethyl, propyl, isopropy, butyl, isobutyl, and tertiary butyl groups. A particularly preferred class of diepoxides suitable for use as plasticizers or combination plasticizer and stabilizer are those diepoxides wherein $R_1$ through $R_{18}$ represent hydrogen atoms and lower alkyl groups and wherein the total number of carbon atoms contained in said lower alkyl groups does not exceed twelve.

It has also been discovered that not only are the diepoxides, herein disclosed, useful as plasticizers for vinyl halide resins but are also useful as heat and light stabilizers as well.

The degree of protection that these novel diepoxides confer upon vinyl halide resin compositions is related to the concentration of the epoxy compound in the resin composition. It has been discovered that as little as 0.5 percent by weight based on the resin of the diepoxide will confer desirable beneficial effects upon the vinyl halide resin composition.

It has also been discovered that the diepoxides can be used alone or in conjunction with other plasticizers. When it is desired to use the diepoxide as a plasticizer, it has been discovered that the amount of epoxide is not narrowly critical. As little as 0.1 part by weight (0.001 percent by weight) of diepoxide per hundred parts of resin will impart a noticeable difference in the desired degree of flexibility and confer some protection against embrittlement at low temperature and the degradative effects of exposure to heat and light. An amount of from 0.1 to 54.0 parts of diepoxide per hundred parts of resin is preferred. However, the majority of plasticized vinyl chloride resin compositions are based on mixtures of plasticizers in order to obtain the desired properties in the finished items and it has been found that the diepoxides disclosed herein can be used effectively in conjunction with conventional plasticizers. The presence of these diepoxides adds measurably to the heat and light stability of the vinyl halide resin composition in addition to contributing towards the flexibilizing of these compositions.

Where stabilization of a vinyl halide composition is the primary objective with little or no interference with other properties, concentrations of diepoxides in the range of from 1.5 to 8 parts by weight per hundred parts of resin have been found to be adequate. In specific applications requiring freedom from color drift during processing, such as in transparent films, it is sometimes necessary to use auxiliary cadmium-containing stabilizers in conjunction with the diepoxides. Also, it has been found that synergism is exhibited when cadmium-barium compounds are used in conjunction with the diepoxides in resin compositions.

The vinyl halide resins which can be satisfactorily plasticized and stabilized by the diepoxides herein disclosed can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers.

The plasticizer-stabilizers of this invention may be employed alone or with other plasticizers in vinyl chloride compositions to obtain the desired results. It is particularly advantageous to employ these plasticizers and stabilizers in conjunction with other commercial plasticizers and the like since it permits the obtainment of highly desirable efficiency through the joint use of a relatively small amount of a highly efficient, more expensive diepoxide compound as a stabilizer and a relatively large amount of a less efficient, less expensive commercial plasticizer without sacrificing the desired effects. As noted, hereinbefore, the incorporation of diepoxides disclosed herein in vinyl halide compositions, in conjunction with cadmium and cadmium barium compounds produces a synergistic stabilizing effect. In other words, the stabilizing effect produced by the use of two different substances in combination is considerably greater than the sum of the stabilizing effects expected from use of either substance alone.

In preparing specimens for evaluation of the compositions for flexibility, resistance to embrittlement at lower temperatures and resistance to the deteriorative effects of heat and light, a basic recipe comprising a vinyl halide resin is mechanically mixed with various amounts of the diepoxy compounds defined by the general formula set forth above with or without a supplementary plasticizer such as dioctyl phthalate and the resulting mixtures fluxed and milled on a heated, laboratory, differential speed two-roll mill. The surface temperature of the rolls is maintained at 158° C. generally but higher temperatures, in the neighborhood of 170° C., can be employed.

The heat-stabilizing ability of the epoxy compounds is determined by both static and dynamic methods. When the heat-stabilizing ability is to be determined by the static method, samples of the fluxed sheet are mounted on a stainless steel wire mesh screen and placed in a circulating air oven wherein the temperature is maintained at about 158° C. Samples are then withdrawn at approximately thirty-minute intervals and discoloration, with respect to the original sheet, is determined by means of a Photovolt Reflection Meter, Model 610, equipped with a Wratten C-5 blue filter. The color is reported as percent blue-light reflectance (percent BLR) as determined with the transparent sheet mounted on a block of magnesium carbonate which reflects 100 percent of the incident beam of blue light.

The dynamic heat-stability test is conducted in a manner similar to the static heat-stability test except that milling of the sheet is continued, with periodic sampling for color measurements, until severe discoloration is induced.

The compositions can be tested for light stability by preparing specimens, as set forth above, and exposing them outdoors. Typical samples were prepared and sent to Florida. The specimens were mounted, with no supporting back, at a forty-five degree angle from the horizontal facing south. The exposure time is recorded in sun-hours, a sun-hour being a cumulative period of sixty minutes during which radiant energy amounts to as much as 0.823 gram-calories per square centimeter per minute. Clippings from the exposed samples are examined, after so many sun hours, to determine whether shortcomings such as discoloration, spotting, stiffening or exudation had been induced by exposure to sunlight. An excessive degree of any one or combination of these shortcomings constitutes failure.

In determining the plasticizing ability of the various epoxy compounds, amounts of the diepoxide are incorporated into the vinyl chloride resin composition which would impart an arbitrary flexibility to the vinyl chloride resin composition. In this case, the selected flexibility was a modulus of 1000 pounds per square inch at 1000 percent elongation as read from a stress-strain curve determined at 24.5° C. on a Scott L-6 tensile tester operating at a constant rate of elongation of four feet per minute. The amount of the diepoxide required to impart this desired degree of flexibility is reported as the effectiveness in parts per 100 parts of resin. Mixtures of vinyl chloride resin composition and epoxy compound were fluxed for five minutes at 158°C., and samples from the resulting milled sheet were then compression moulded for ten minutes at 158° C. to form suitable samples for testing.

The following examples describe processes of the invention involving the production of the various novel compositions and are intended to serve merely as illustrations and are not intended to limit the scope of the invention:

EXAMPLE I

A recipe was prepared to test the performance of diethylene glycol bis-(3,4-epoxycyclohexanecarboxylate) as a light stabilizer and a heat stabilizer for vinyl chloride resin compositions. The recipe consisted of 100 parts of a vinyl chloride-vinyl acetate copolymer containing 96 to 98 percent vinyl chloride, 38.6 parts of a conventional plasticizer, a dioctyl phthalate, and 15.4 parts of the diepoxide. Another recipe was prepared from which the diepoxide was omitted which consisted of 100 parts of a vinyl chloride-vinyl acetate copolymer containing 96 to 98 percent vinyl chloride and 54 parts of dioctyl phthalate as a plasticizer. Both recipes were then evaluated and subjected to the heat and light stability tests referred to hereinbefore. The results of those tests are summarized in the following Table I:

*Table I*

| Test No. | Composition (parts) | | | Light stability, sun-hours to failure in Florida | Heat stability, min. at 158° C. to 60% BLR | Mill stability, min. at 170° C. to 60% BLR |
| --- | --- | --- | --- | --- | --- | --- |
| | Resin | Dioctyl phthalate | Epoxy compd. | | | |
| 1 | 100 | 54 | 0 | <100 | 13 | 3.4 |
| 2 | 100 | 38.6 | 15.4 | 1,000 | 76 | 22 |

As may be readily observed, the unstabilized composition failed to survive 100 sun-hours in Florida but by substituting 15.4 parts of diethylene glycol bis(3,4-epoxycyclohexanecarboxylate) for a similar amount of dioctyl phthalate, light stability was extended to 1,000 sun-hours. Similarly, the substitution of the epoxide for an equivalent amount of dioctyl phthalate increased the 158° C.

heat stability from 13 to 76 minutes and the 170° C. mill stability from 3.4 to 22 minutes.

EXAMPLE II

Similarly, recipes were prepared as in Example 1, but utilizing the diepoxide 2-ethyl-1,3-hexanediol bis-(3,4-epoxycyclohexanecarboxylate). These recipes were tested with the following results:

Table II

| Test No. | Composition (parts) | | | Light stability, sun-hours to failure in Florida | Heat stability, min. at 158° C. to 60% BLR | Mill stability, min. at 170° C. to 60% BLR |
|---|---|---|---|---|---|---|
| | Resin | Dioctyl phthalate | Epoxy compd. | | | |
| 1 | 100 | 54 | 0 | <100 | 13 | 3.4 |
| 2 | 100 | 38.6 | 15.4 | >1,750 | 90 | 29 |

In this case the composition stabilized with 2-ethyl-1,3-hexanediol bis-(3,4-epoxycyclohexanecarboxylate) survived more than 1,750 sun-hours whereas the unstabilized composition failed to survive 100 sun-hours. Similarly, the substitution of the diepoxide for an equivalent amount of dioctyl phthalate increased the 158° C. heat stability from 13 to 90 minutes and the 170° C. mill stability from 3.4 to 29 minutes.

EXAMPLE III

Seven other resin compositions were prepared comprising a vinyl chloride-vinyl acetate copolymer resin containing from 96 to 98 percent vinyl chloride, varying amounts of a conventional plasticizer, dioctyl phthalate and various amounts of the following diepoxides:

(a) Diethylene glycol bis-(3,4-epoxy-6-methylcyclohexanecarboxylate)

(b) 3-methyl-1,5-pentanediol bis-(3,4-epoxycyclohexanecarboxylate)
(c) Triethylene glycol bis-(3,4-epoxycyclohexanecarboxylate)
(d) 1,5-pentanediol bis-(3,4-epoxycyclohexanecarboxylate)
(e) 2-methoxymethyl-2,4-dimethyl-1,5-pentanediol bis-(3,4-epoxycyclohexanecarboxylate)
(f) 2,2-diethyl-1,3-propanediol bis-(3,4-epoxycyclohexanecarboxylate)
(g) 1,6-hexanediol bis-(3,4-epoxycyclohexanecarboxylate)

The performance of the above-identified diepoxides as heat stabilizers for vinyl chloride resins is shown in the accompanying Table III as compared with an unstabilized composition (Test No. 8).

Table III

| Test No. | Composition (parts) | | | Light stability, sun-hours to failure in Florida | Heat stability, min. at 158° C. to 60% BLR | Mill stability, min. at 170° C. to 60% BLR |
|---|---|---|---|---|---|---|
| | Resin | Dioctyl phthalate | Epoxy compd. | | | |
| 1 | 100 | 43.5 | 10.5 (a) | >1,750 | 21 | |
| 2 | 100 | 44.0 | 10.0 (b) | | 72 | |
| 3 | 100 | 41.3 | 12.7 (c) | | 63 | |
| 4 | 100 | 44.1 | 9.9 (d) | | 82 | |
| 5 | 100 | 40.4 | 13.6 (e) | | 78 | |
| 6 | 100 | 38.6 | 15.4 (f) | | | 37 |
| 7 | 100 | 38.6 | 15.4 (g) | | | 29 |
| 8 | 100 | 54.0 | 0 | <100 | 13 | 3.4 |

Similarly, the diepoxides employed in this test increased the 158° C. heat stability of the compositions from 13 to as high as 82 minutes and increased the 170° C. mill stability from 3.4 to as much as 37 minutes.

EXAMPLE IV

In a manner similar to the previous examples, recipes were prepared containing 2-ethyl-1,3-hexanediol bis-(3,4-epoxycyclohexanecarboxylate) as a stabilizer alone or in conjunction with cadmium stearate as an auxiliary stabilizer with various plasticizers such as dioctyl phthalate, tri-(2-ethylhexyl) phosphate and a monoalkyl diphenyl phosphate (Santicizer 141). The compositions were evaluated and the results are reported in the accompanying Table IV:

Table IV

| Test No. | Composition (parts) | | | Initial BLR | Mill stability, minutes at 170° C. to— | | | Light stability, sun-hours to failure in Florida |
|---|---|---|---|---|---|---|---|---|
| | Resin | Plasticizer | Epoxy compd. | | 75% BLR | 60% BLR | 40% BLR | |
| | | *Dioctyl phthalate* | | | | | | |
| 1 | 100 | 52.5 | 1.5 | 83 | 12 | 21 | 30 | 500 |
| 2 | 100 | 51.0 | 3.0 | 84 | 20 | 40 | 63 | 1,000 |
| 3 | 100 | 51.0 | 3.0+0.5% cadmium stearate. | 90 | 13 | 17 | 22 | 1,000 |
| 4 | 100 | 50.1 | 3.9 | 84 | | | | 1,000 |
| 5 | 100 | 46.3 | 7.7 | 83 | 13 | 29 | 30 | 1,500 |
| 6 | 100 | 38.6 | 15.4 | 83 | 12 | 26 | 30 | 1,750 |
| 7 | 100 | 0 | 54.0 | 83 | 10 | 30 | 90 | 1,000 |
| | | *Tri-(2-ethylhexyl) phosphate* | | | | | | |
| 8 | 100 | 54.0 | | | | | | 100 |
| 9 | 100 | 52.5 | 1.5 | 81 | 5 | 14 | 20 | 250 |
| 10 | 100 | 50.1 | 3.9 | 79 | 3 | 14 | 20 | 250 |
| 11 | 100 | 46.3 | 7.7 | 83 | 9 | 20 | 30 | 400 |
| 12 | 100 | 38.6 | 15.4 | 84 | 11 | 22 | 30 | 1,000 |
| | | *Monoalkyl diphenyl phosphate* | | | | | | |
| 13 | 100 | 54.0 | | | | | | 100 |
| 14 | 100 | 52.5 | 1.5 | 74 | | 4 | 9 | 250 |
| | | | | 72 | | | | |
| 15 | 100 | 50.1 | 3.9 | 72 | | 13 | 20 | 250 |
| 16 | 100 | 46.3 | 7.7 | 77 | 4 | 23 | 30 | 1,000 |
| 17 | 100 | 38.6 | 15.4 | 70 | | 12 | 30 | 1,250 |

EXAMPLE V

A vinyl copolymer resin, containing approximately 97 percent copolymerized vinyl chloride and 3 percent copolymerized vinyl acetate, was mechanically mixed with 3-methyl-1,5-pentanediol bis-(3,4-epoxy-2, or 3, or 4-methylcyclohexanecarboxylate). The amount of epoxide employed comprises 41.0 percent. The plasticized composition was tested and had the following physical properties:

| | |
|---|---|
| Effectiveness, percent | 41.0 |
| Load at 100% elong. (p. s. i.), at 24.5° C. | 1000 |
| $T_F$ (° C.) | —9 |
| $T_4$ (° C.) | 7 |
| $T_B$ (° C.) | —4 |
| SPI volatility loss (percent) in 24 hrs. at 70° C. | 3.5 |
| Percent extraction: oil, 10 days at 25° C. | 5.4 |
| Percent extraction: water, 10 days at 25° C. | 7.5 |

In reporting the above-described physical properties of the plasticized composition certain symbols and abbreviations are employed for the sake of clarity and brevity. These symbols and abbreviations are defined as follows:

ASTM=American Society of Testing Materials $T_F$ and $T_4$=points corresponding to 135,000 and 10,000 pounds per square inch respectively on a stiffness-temperature curve obtained in accordance with the procedure set forth in the manual of ASTM D1043–51.

Brittle temperature (TB)=the temperature obtained by means of low temperature impact test according to the procedure set forth in the manual of ASTM D746–52T.

SPI volatility loss=value obtained in accordance with the procedure in the manual of ASTM D1203–52T.

Insofar as possible the effectiveness of the plasticizer is described as the percent of plasticizer necessary to obtain a tensile modulus of 1000 pounds per square inch at 100% elongation, at a test temperature of 24.5° C., with the above-described resin.

What is claimed is:

1. A plasticized vinyl chloride composition which comprises a vinyl chloride resin containing intimately dispersed therein from 0.1 to 54.0 parts by weight per hundred parts of resin of a diepoxide compound represented by the general formula:

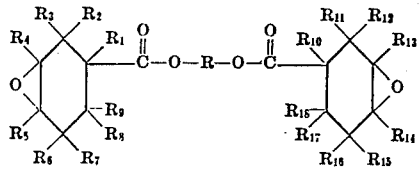

wherein $R_1$ through $R_{18}$ represent members selected from the group consisting of hydrogen atoms and lower alkyl groups and R represents members selected from the group consisting of divalent aliphatic radicals and oxygen interrupted alkylene radicals.

2. A plasticized vinyl chloride composition which comprises a vinyl chloride resin containing from 0.1 to 54.0 parts by weight per hundred parts of resin of diethylene glycol bis-(3,4-epoxycyclohexanecarboxylate).

3. A plasticized vinyl chloride composition which comprises a vinyl chloride resin containing from 0.1 to 54.0 parts by weight per hundred parts of resin of 2-ethyl-1,3-hexanediol bis-(3,4-epoxycyclohexanecarboxylate).

4. A plasticized vinyl chloride composition which comprises a vinyl chloride resin containing from 0.1 to 54.0 parts by weight per hundred parts of resin of 1,5-pentanediol bis-(3,4-epoxycyclohexanecarboxylate).

5. A plasticized vinyl chloride composition which comprises a vinyl chloride resin containing from 0.1 to 54.0 parts by weight per hundred parts of resin of 2-methoxymethyl-2,4-dimethyl-1,5-pentanediol bis - (3,4-epoxycyclohexanecarboxylate).

6. A plasticized vinyl chloride composition which comprises a vinyl chloride resin containing from 0.1 to 54.0 parts by weight per hundred parts of resin of 1,6-hexanediol bis-(3,4-epoxycyclohexanecarboxylate).

7. A composition of matter stabilized against the deteriorative and degradative effects of heat and light which comprises a vinyl chloride resin containing intimately dispersed therein from 1.5 to 8 percent by weight based on the vinyl chloride resin of a diepoxide compound represented by the general formula:

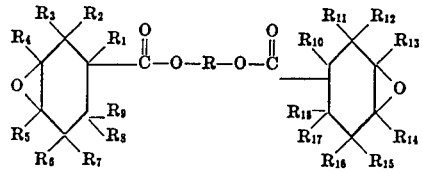

wherein $R_1$ through $R_{18}$ represent members selected from the group consisting of hydrogen atoms and lower alkyl groups and R represents members selected from the group consisting of divalent aliphatic hydrocarbon radicals and oxygen interrupted alkylene radicals.

8. A composition of matter stabilized against the deteriorative and degradative effects of heat and light which comprises a vinyl chloride resin containing intimately dispersed therein from 1.5 to 8 percent by weight based on the vinyl chloride resin of diethylene glycol bis-(3,4-epoxycyclohexanecarboxylate).

9. A composition of matter stabilized against the deteriorative and degradative effects of heat and light which comprises a vinyl chloride resin containing intimately dispersed therein from 1.5 to 8 percent by weight based on the vinyl chloride resin of 2-ethyl-1,3-hexanediol bis-(3,4-epoxycyclohexanecarboxylate).

10. A composition of matter stabilized against the deteriorative and degradative effects of heat and light which comprises a vinyl chloride resin containing intimately dispersed therein from 1.5 to 8 percent by weight based on the vinyl chloride resin of 1,6-hexanediol bis-(3,4-epoxycyclohexanecarboxylate).

References Cited in the file of this patent

UNITED STATES PATENTS

| | | |
|---|---|---|
| 2,559,177 | Terry et al. | July 3, 1951 |
| 2,609,355 | Winkler | Sept. 2, 1952 |
| 2,745,847 | Phillips et al. | May 15, 1956 |